(12) United States Patent
Werner et al.

(10) Patent No.: US 6,293,553 B1
(45) Date of Patent: Sep. 25, 2001

(54) BRUSH SEAL

(75) Inventors: Klemens Werner, Munich; Alfons Gail, Friedberg, both of (DE)

(73) Assignee: Mtu Motoren-und Turbinen-Union München GmbH, Munich (DE)

(*) Notice: Subject to any disclaimer, the term of this patent is extended or adjusted under 35 U.S.C. 154(b) by 0 days.

(21) Appl. No.: 09/423,913
(22) PCT Filed: Apr. 30, 1998
(86) PCT No.: PCT/DE98/01204
 § 371 Date: Feb. 14, 2000
 § 102(e) Date: Feb. 14, 2000
(87) PCT Pub. No.: WO98/53230
 PCT Pub. Date: Nov. 26, 1998

(30) Foreign Application Priority Data

May 16, 1997 (DE) .............................................. 197 20 649

(51) Int. Cl.$^7$ ....................................................... F16J 15/44
(52) U.S. Cl. ................................................................ 277/355
(58) Field of Search ................................................ 277/355

(56) References Cited

U.S. PATENT DOCUMENTS

| 5,066,024 | * | 11/1991 | Reisinger et al. | 277/355 |
| 5,316,318 | * | 5/1994 | Veau | 277/355 |
| 5,688,105 | * | 11/1997 | Hoffelner | 277/355 X |
| 5,794,938 | * | 8/1998 | Hofner et al. | 277/355 X |

FOREIGN PATENT DOCUMENTS

| 39 07 614 A1 | 9/1990 | (DE) . |
| 0 043 315 | 5/1984 | (EP) . |
| 617 216 A1 | 9/1994 | (EP) . |
| 0 778 431 A1 | 6/1997 | (EP) . |
| WO 86/05252 | 9/1986 | (WO) . |

* cited by examiner

Primary Examiner—Robert J. Sandy
Assistant Examiner—Karlena D. Schwing
(74) Attorney, Agent, or Firm—Schiff Hardin & Waite

(57) ABSTRACT

A brush seal for sealing a rotor against a housing. The brush seal includes a number of bristles that are each attached to the housing by a clamp member. The clamp member is positioned between a supporting plate and a front panel. The supporting plate has a supporting section for supporting the bristles in an inclined position.

8 Claims, 1 Drawing Sheet

BRUSH SEAL

BACKGROUND OF THE INVENTION

1. Field of the Invention

The invention is directed to a brush seal.

2. Description of the Prior Art

Such brush seals are utilized, for example, in gas turbines in order to seal the interspace between a housing and a rotor rotating at a comparatively high speed against leakage. In general, this ensues in the presence of hot, pressurized gas. Since no satisfactory sealing effect can be achieved under these conditions with simple rubber ring seals, numerous, different brush seals have been developed. Given these seals, the ends of the bristles that are combined to form a dense bristle packet project beyond the inside edge of an inside bore of the supporting plate and thus seal an interspace—to be kept optimally small—between the inside edge of the supporting plate and the rotor surface. This interspace is always present, since the dimensions of the seal, of the housing and of the rotor can change due to thermal stresses expansions or the like, and a minimum play between the supporting plate and the rotor must not be downwardly transgressed for safety reasons.

When a large differential pressure is adjacent the seal, then the supporting plate arranged at the low-pressure side supports the bristles to prevent sagging toward the low-pressure side in a direction proceeding parallel to the rotor axis. A sagging of the bristles is opposed because this reduces their length and, thus, opens the interspace between the inside edge of the supporting plate and the rotor surface, which leads to an increase of leakage. A sagging of the projecting bristle ends, however, cannot be avoided.

What is meant hereinabove and hereafter by an axial direction is a direction proceeding parallel to the longitudinal axis of the rotor, and what is meant by a radial direction or plane is a direction proceeding or plane extending perpendicular to the longitudinal axis of the rotor.

International Patent Document No. WO-A-86/05252 discloses a brush seal with a multitude of bristles in a holder for sealing two spaces differing in pressure, wherein the bristles are directed at an angle β of 5° through 45° by setting means for improving the sealing effect toward the side of the higher pressure. When a differential pressure is adjacent, the bristles are pressed against the sealing surface from the side of higher pressure, which, on the one hand, leads to a dependable sealing effect and, on the other hand, however, leads to considerable wear of the bristles.

German Patent Document No. DE 3907 614 A1 discloses a brush seal wherein the bristles are clamped in a slotted tube that is clamped between two support rings joined to form a housing, wherein the inside edge of the support ring at the high-pressure side includes a greater spacing from the surface of a rotor than the inside edge of the support ring at the low-pressure side. A special design of the support ring at the low-pressure side, which is adapted to the bristles is not disclosed, nor is a setting of the bristles.

European Patent Application No. 0 778 431 A1 discloses a brush seal, wherein a support element arranged between the bristles—which are not set relative to the radial direction—and the low-pressure side is fashioned such that a chamber is present between the bristles and the support element and this chamber is supplied with fluid, whose pressure is higher than that at the low-pressure side, in order to increase the restoring force.

European Patent Application No. 0 617 216 A1 discloses a brush seal means with a support plate comprising a recess, the bristles being placed against the free end section thereof after being charged with pressure.

Given a brush seal disclosed by European Patent Application No. 0 453 315, the entire supporting plate serves as supporting surface against which the bristles—except for their projecting ends—lie over their entire, remaining length. For improving the sealing effect, the inside edge of an inside bore of the supporting plate is provided with an erodible material layer in order to lengthen the supporting surface and support the bristles close to their tips and to simultaneously reduce the interspace between the supporting plate and the rotor.

What proves disadvantageous given this seal, however, particularly given a differential pressure adjacent thereto, is that the bristles can deflect radially outward given an excursion of the rotor that, for example, can occur due to thermal stresses or expansions, but remain in this position even after return of the rotor into the central position as a consequence of aerodynamic effects. As a result of the lateral deflection of the bristles, the interspace between the supporting plate and the rotor is opened, so that the leakage increases. It is known that the bristles thereby adhere to the supporting plate and move back into their original position only after being completely relieved, i.e. a differential pressure of approximately zero, to close or seal the interspaces.

SUMMARY OF THE INVENTION

The invention is based on the object of improving a brush seal of the species initially cited such that a good sealing effect is also achieved given high differential pressures and excursions of the rotor.

The advantage that the brushes only have their end sections supported at the supporting surface, as a result whereof their flexibility is noticeably increased even given high differential pressures. Since the bristles exhibit their maximum flexibility in their end section remote from the clamping location and, moreover, are continuously excited to vibrations by the flowing leakage air, the bristles follow the rotor motion, i.e. they are laterally outwardly pressed given the excursion thereof and return into their original position immediately after the return of the rotor in to the central position. Moreover, the flowing leakage air forms an air pillow in the interspace between the bristles and the supporting plate, this reduces the friction between the bristles and the supporting surface and opposes an adhesion of the bristles to the supporting plate.

The bristles are inclined toward the supporting plate relative to a radial plane, i. e. a plane proceeding radially relative to the longitudinal rotor axis, so that a defined seating of the end sections of the bristles at the supporting section can be achieved. The bristles preferably slant at an angle of approximately 6°.

In another preferred development, the supporting plate, proceeding from the clamping region of the bristles, extends with an axial spacing from the bristles and, adjoining an inside annular edge of an inside bore in the supporting plate, includes a region slanting toward the bristles at whose inner lateral surface a supporting section is fashioned at which the end sections of the bristles are to be supported.

It is advantageous that the length of the end sections of the bristles to be supported at the supporting section amounts to at most one-fourth of their total length, since the bristles exhibit their maximum flexibility in these end sections remote from the clamping region, so that the bristles, despite seating against the supporting section, immediately spring back here into their original position after a deflection motion.

It is also advantageous that an inside annular edge of a bore of the front panel comprises a greater spacing from the surface of the rotor than the inside annular edge of the supporting plate. Although only a small interspace likewise exists between the inside annular edge of the front panel and the surface of the rotor, greater manufacturing tolerances can be allowed. As a result thereof, what is referred to as the "blow down" effect is minimized, and no increased wear of the bristles occurs. Moreover, the bristles are thereby protected against damage during mounting/demounting and are also protected against damage due to air turbulence.

The bristles are preferably clamped at one side between the front panel and the supporting plate, so that they can be held in a simple way between the front panel and the supporting plate with different attack or inclination angles relative to a radial plane.

It is expedient to arrange a clamp member in the clamping region between the bristles and the front panel as well as the supporting plate. The bristle packet, which is wound around a core wire, is clamped in the clamp member.

DESCRIPTION OF THE PREFERRED EMBODIMENT

Figure 1:
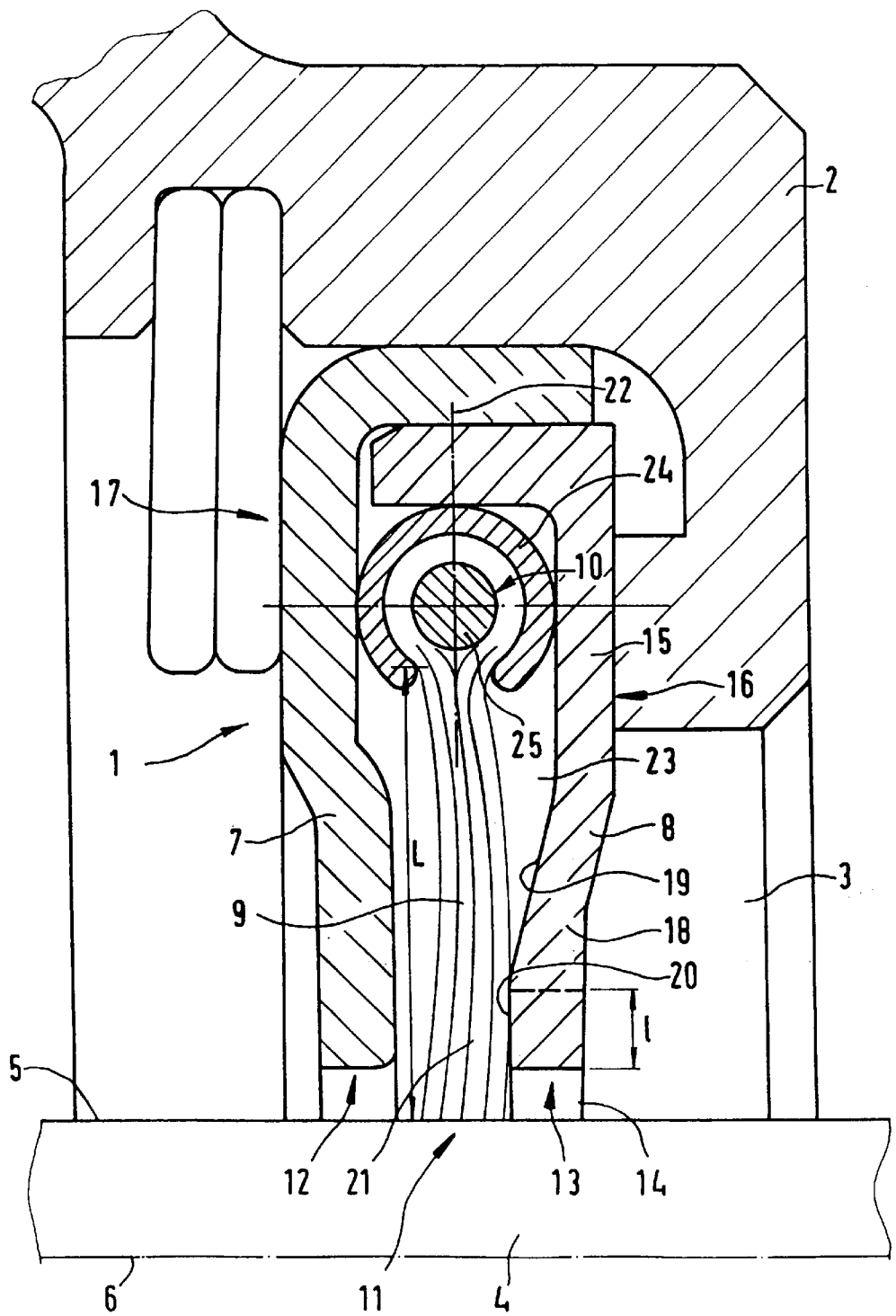
FIG. 1 shows a schematic cross-sectional view of an exemplary embodiment of the inventive brush seal.

FIG. 1 shows a brush seal referenced 1 overall that is clamped in a housing 2. A rotor 4, whose surface is referenced 5 and whose longitudinal axis is referenced 6, extends through a bore 3 in the housing 2. The brush seal 1 essentially comprises a front panel 7, a supporting plate 8 and a plurality of densely packed bristles 9 that are firmly clamped between the front panel 7 and the supporting plate 8, at a clamping location 10. Given a differential pressure adjacent the brush seal 1, the front panel 7 is arranged at the high-pressure side and the supporting plate 8 is arranged at the low-pressure side. The bristles 9 clamped at one side extend between the front panel 7 and the supporting plate 8 and have their free ends 11 remote from the clamping location 10 projecting beyond the inside annular edges 12 and 13 of the front panel 7 and the supporting plate 8. The ends 11 of the bristles 9 touch the surface 5 of the rotor and thus seal an annular interspace between the inside edge 13 of the supporting plate 8 and the surface 5 of the rotor 4.

The front panel 7 and the supporting plate 8 each respectively include an inside bore coaxial with the longitudinal axis 6 of the rotor 4, so that their inside edges 12 and 13 are spaced from the surface 5 of the rotor 4. The inside edge 12 of the front panel 7 also has only comparatively slight play relative to the rotor surface 5. The bristles 9, which can be composed of various materials familiar to a person skilled in the art, are thereby protected against damage during handling and during air turbulence during operation.

In the present exemplary embodiment, the supporting plate 8 comprises a first section 15 extending in a radial plane relative to the rotor axis 6 whose outside surface 16 is parallel to an outside surface 17 of the front panel 7 for an exactly fitting attachment of the brush seal to the housing 2. The front panel 7 and the supporting plate 8 also respectively include a rectangularly inwardly angled-off section that, however, are of no significance here and are only mentioned for the sake of completeness.

A region 18 of the supporting plate 8 adjoining the inside edge 13 of the supporting plate 8 is slanted toward the brushes 9, and the region 18 has an inside surface 19 with a supporting surface 20 at which the bristles 9 have their end sections 21 supported. As can be seen at the clamping location 10, the bristles 9 or the bristle packet is wound over a core wire 25 and is clamped with a clamp member 24 fashioned as a slotted tube that has the cross-sectional shape of an open ring C-tube. The bristles 9 in this exemplary embodiment are slanted toward the supporting plate 8 with reference to a radial plane 22. The angle amounts to approximately 6°. In this way, a defined seating of the end sections 21 of the bristles 9 at the supporting surface 20 of the supporting plate 8 can be achieved. This measure, however, is no compulsory since the end sections 21 can also be initially pressed against the supporting surface 20 by the differential pressure. The pressing power of the brushes 9 at the supporting section 20 can thus be reduced given extremely high differential pressures.

The radial length 1 of the supporting surface 20 of the supporting plate 8 amounts to approximately 2 mm and one-fifth of the free (overall) length L of the bristles 9, so that the bristles 9 have a great region of their length L extending at a distance from the inside surface 19 of the supporting plate 8 to form an interspace 23.

Since the bristles 9 are most flexible at their end sections 21 remote from the clamping location 10 and, moreover, are constantly caused to vibrate by the leakage air flowing in the interspace 23, the bristles 9 laterally deflect given an excursion of the rotor 4 from its central position but, together with the rotor 4, immediately return into their original position given the elimination of the cause such as, for example, thermal stresses, effecting the excursion of the rotor 4. Due to an air cushion forming in the interspace 23, over and above this, the friction between the end sections 21 of the bristles 9 and the supporting section 20 of the supporting plate 8 is reduced. As a result thereof, a good sealing effect of the brush seal 1 is assured even given an adjacent differential pressure and excursions of the rotor, so that no significant rise in the leakage occurs.

Although modifications and changes may be suggested by those skilled in the art, it is the intention of the inventors to embody within the patent warranted hereon all changes and modifications as reasonably and properly come within the scope of their contribution to the art.

What is claimed is:

1. A brush seal received in a bore of a housing for forming a seal between the bore and a rotor extending therethrough, said seal comprising a front panel and a supporting plate being spaced apart, each of said front panel and supporting plate having a bore with a annular inside edge, said supporting plate having an inside surface facing the front panel, said inside surface having an annular supporting surface adjacent the inside edge extending in a radial plane relative to a longitudinal axis of the rotor, said inside surface of the plate having an inward section inclined relative to the radial plane, a plurality of bristles being held between the front panel and the supporting plate to be inclined to the radial plane with a free end of the bristles extending inwardly beyond the inside edge of the supporting plate and the bristles being supported on the supporting section with an interspace between the remaining length of the bristles and the inside surface of said plate.

2. A brush seal according to claim 1, wherein the bristles are inclined at an angle approximate six degrees (6°) to the supporting surface.

3. A brush seal according to claim 1, wherein the supporting surface has a radial length equal to or less than approximately one-fourth of the bristle length.

4. A brush seal according to claim 1, wherein the supporting surface has a radial length of approximately two millimeters.

5. A brush seal according to claim 1, wherein the inside edge of the front panel has a greater spacing from the surface of the rotor than the inside edge of the supporting plate.

6. A brush seal according to claim 1, wherein the bristles are held in the seal by being clamped between the front panel and the supporting plate.

7. A brush seal according to claim 1, which includes a clamp member, said clamp member being attached to the bristles and being clamped between the front panel and the supporting plate.

8. A brush seal according to claim 7, wherein the clamp member is a slotted annular tube.

\* \* \* \* \*